United States Patent
Xu et al.

(10) Patent No.: US 10,922,402 B2
(45) Date of Patent: Feb. 16, 2021

(54) SECURING SECRET DATA EMBEDDED IN CODE AGAINST COMPROMISED INTERRUPT AND EXCEPTION HANDLERS

(71) Applicant: VMware, Inc., Palo Alto, CA (US)

(72) Inventors: Wei Xu, Sunnyvale, CA (US); Alok Nemchand Kataria, Pune (IN); Rakesh Agarwal, Palo Alto, CA (US); Martim Carbone, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 452 days.

(21) Appl. No.: 14/550,881

(22) Filed: Nov. 21, 2014

(65) Prior Publication Data

US 2016/0147993 A1    May 26, 2016

(51) Int. Cl.
*G06F 21/53* (2013.01)
*G06F 13/24* (2006.01)

(52) U.S. Cl.
CPC .................................. *G06F 21/53* (2013.01)

(58) Field of Classification Search
CPC ....................................................... G06F 21/53
See application file for complete search history.

(56) References Cited

U.S. PATENT DOCUMENTS

| | | | |
|---|---|---|---|
| 4,809,160 A | 2/1989 | Mahon et al. | |
| 6,463,535 B1 | 10/2002 | Drews | |
| 6,704,873 B1 | 3/2004 | Underwood | |
| 7,757,295 B1 | 7/2010 | Hadaaegh | |
| 8,819,450 B2 | 8/2014 | Cherian et al. | |
| 8,959,577 B2 | 2/2015 | Epstein | |
| 9,176,752 B1 | 11/2015 | Marr et al. | |
| 2003/0188174 A1 | 10/2003 | Zisowski | |
| 2005/0166001 A1 | 7/2005 | Conover et al. | |
| 2008/0184211 A1 | 7/2008 | Nickolls et al. | |
| 2008/0288940 A1 | 11/2008 | Adams et al. | |
| 2009/0150463 A1 | 6/2009 | Sekiguchi et al. | |
| 2009/0177830 A1* | 7/2009 | Orion | G06F 9/4812 710/267 |

(Continued)

OTHER PUBLICATIONS

U.S. Appl. 14/500,754, filed Sep. 29, 2014, entitled "Embedding Secret Data in Code".

(Continued)

*Primary Examiner* — Noura Zoubair
(74) *Attorney, Agent, or Firm* — Patterson + Sheridan, LLP

(57) ABSTRACT

In a computer system operable at more than one privilege level, an interrupt security module handles interrupts without exposing a secret value of a register to virtual interrupt handling code that executes at a lower privilege level than the interrupt security module. The interrupt security module is configured to intercept interrupts generated while executing code at lower privilege levels. Upon receiving such an interrupt, the interrupt security module overwrites the secret value of the register with an unrelated constant. Subsequently, the interrupt security module generates a virtual interrupt corresponding to the interrupt and forwards the virtual interrupt to the virtual interrupt handling code. Advantageously, although the virtual interrupt handling code is able to determine the value of the register and consequently the unrelated constant, the virtual interrupt handling code is unable to determine the secret value.

12 Claims, 10 Drawing Sheets

(56) References Cited

U.S. PATENT DOCUMENTS

| | | | |
|---|---|---|---|
| 2010/0306773 A1 | 12/2010 | Lee et al. | |
| 2011/0141124 A1 | 6/2011 | Halls et al. | |
| 2011/0191772 A1 | 8/2011 | Larimore et al. | |
| 2012/0110572 A1 | 5/2012 | Kodi et al. | |
| 2012/0317610 A1 | 12/2012 | Kashyap | |
| 2013/0086299 A1 | 4/2013 | Epstein | |
| 2013/0097599 A1 | 4/2013 | Konik et al. | |
| 2013/0155083 A1 | 6/2013 | McKenzie et al. | |
| 2013/0185735 A1 | 7/2013 | Farrell et al. | |
| 2013/0276056 A1 | 10/2013 | Epstein | |
| 2013/0347131 A1 | 12/2013 | Mooring et al. | |
| 2014/0195821 A1* | 7/2014 | Henry | G06F 12/0875 713/190 |
| 2014/0351472 A1* | 11/2014 | Jebson | G06F 13/24 710/269 |
| 2015/0220735 A1 | 8/2015 | Paithane et al. | |
| 2015/0248554 A1 | 9/2015 | Dumitru et al. | |
| 2015/0334126 A1 | 11/2015 | Mooring et al. | |

OTHER PUBLICATIONS

U.S. Appl. 14/500,779, filed Sep. 29, 2014, entitled "Verifying Caller Authorization Using Secret Data Embedded in Code".
International Search Report dated Oct. 20, 2015 in related PCT Patent Application PCT/US2015/043501.
Office Action dated Nov. 20, 2015 in related U.S. Appl. 14/500,754, filed Sep. 29, 2014.
Notice of Allowance dated Mar. 23, 2016, in related U.S. Appl. No. 14/500,779.
Notice of Allowance dated Apr. 25, 2016, in related U.S. Appl. No. 14/500,754.

* cited by examiner

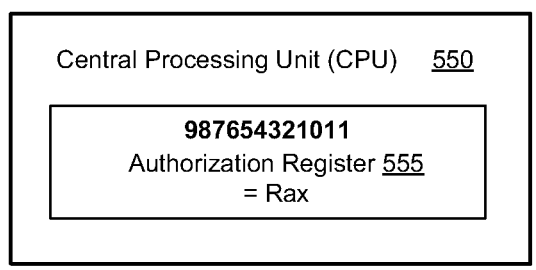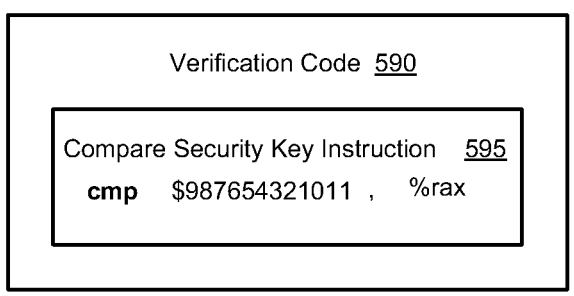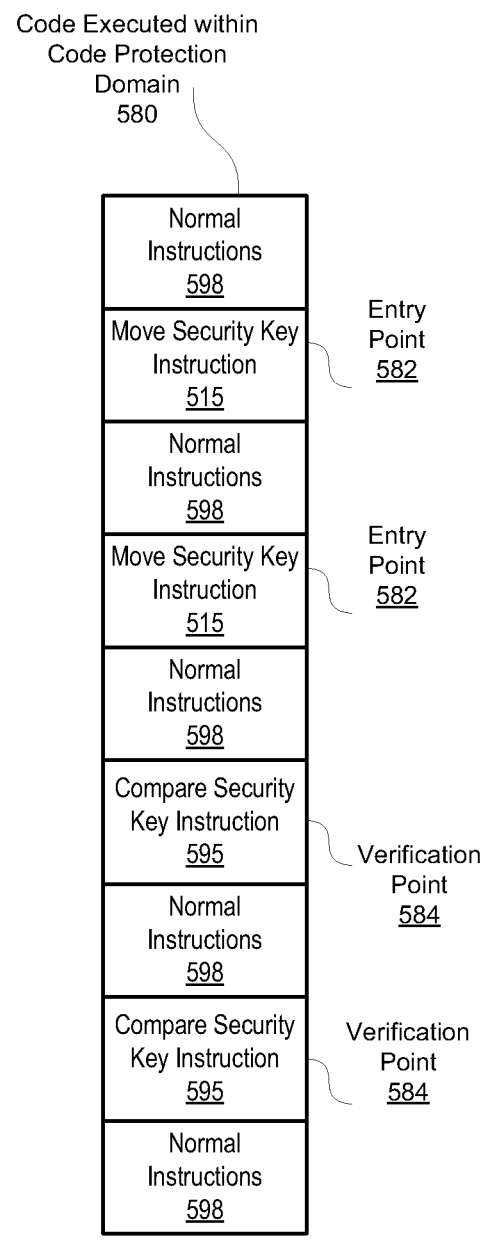
FIGURE 5A  FIGURE 5B

SECURING SECRET DATA EMBEDDED IN CODE AGAINST COMPROMISED INTERRUPT AND EXCEPTION HANDLERS

CROSS-REFERENCE TO RELATED APPLICATION(S)

This application is related to and hereby incorporates by reference U.S. patent application Ser. No. 14/500,754, filed Sep. 29, 2014 and entitled "Embedding Secret Data in Code," and U.S. patent application Ser. No. 14/500,779, filed Sep. 29, 2014 and entitled "Verifying Caller Authorization Using Secret Data Embedded in Code."

BACKGROUND

Computer systems and applications executing within the computer systems are often configured to implement security measures designed to thwart malicious activity, such as corrupting memory or accessing privileged information. For example, two separate authorized software applications may share a confidential passkey that the applications use to authenticate data transmissions. However, while such an authentication process reduces the security risk associated with a malicious user intercepting data transmissions, the security provided may be breached if the confidential pass key is obtained by the malicious user.

As illustrated by this example of data transmissions secured by passkey, maintaining the secrecy of some amount of data that is used by software applications is useful for implementing comprehensive security measures. In one attempt to limit the exposure of confidential data to unauthorized access, the confidential data is changed frequently. While this approach limits the vulnerability of the confidential data to the change interval, such an approach does not eliminate the vulnerability of the confidential data. Further, in some scenarios, the flexibility required to change confidential data periodically is not available or is too expensive to implement. Consequently, there is a need for securing confidential data used by software applications, particularly in the presence of a potentially compromised operating system, in a more effective manner.

BRIEF DESCRIPTION OF THE DRAWINGS

FIGS. 5A and 5B are conceptual diagrams that illustrate how guest integrity module creates a code protection domain.

DETAILED DESCRIPTION

Figure 1:
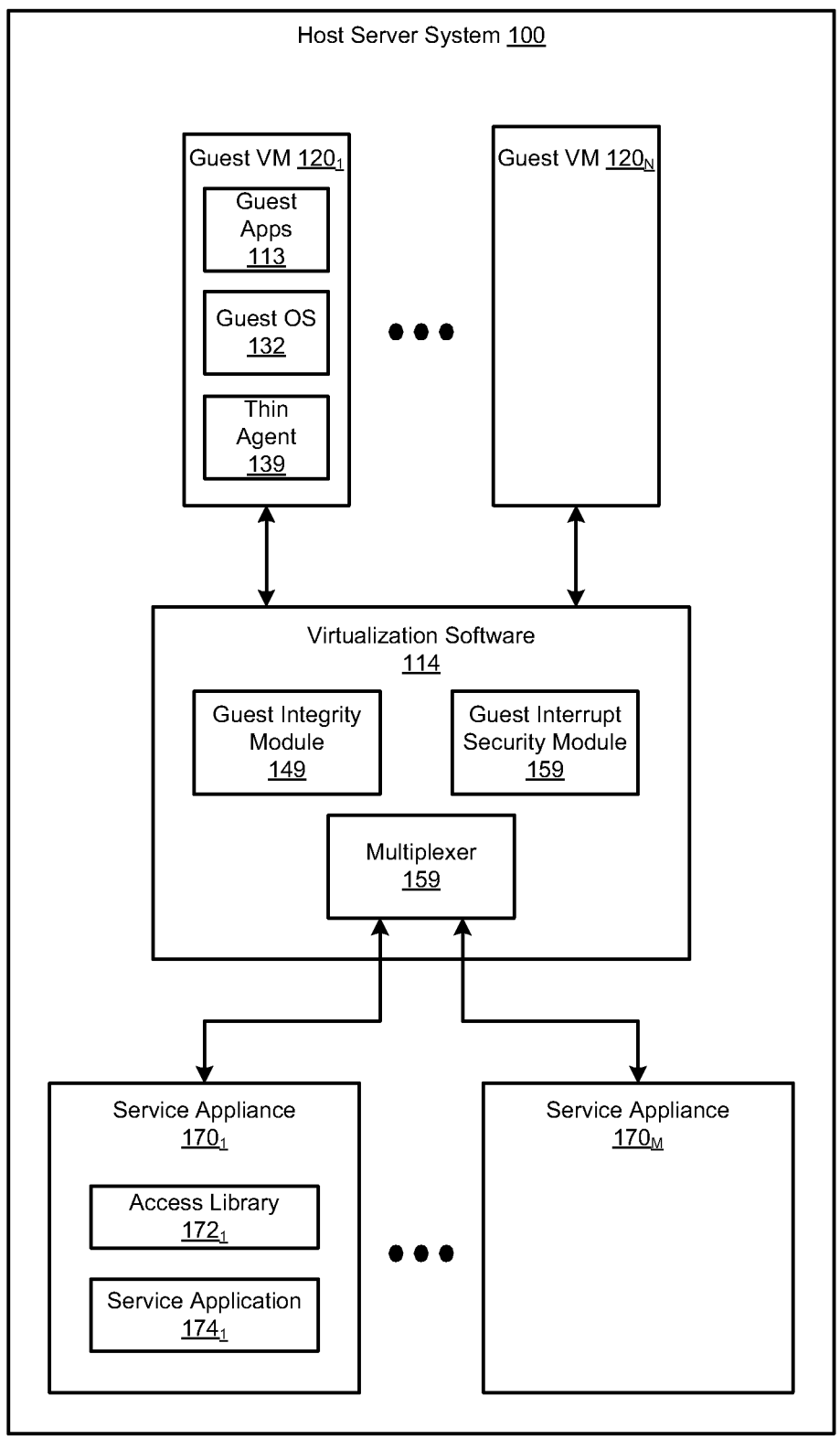
FIG. 1 is a block diagram of a virtualized host server system that enables secure communications between a guest virtual machine and a service appliance.

FIG. 1 is a block diagram of a virtualized host server system 100 that enables secure communications between a guest virtual machine 120 and a service appliance 170. Host server system 100 is built on an underlying hardware computing platform comprising one or more computer systems, each of which may be a desktop computer, laptop computer, tablet computer, mobile device such as a smart phone, server grade computer system, or any other suitable hardware computing platform, including systems based on different variations of the well-known ARM or x86 architecture platforms. Host server system 100 is configured to execute virtualization software 114, one or more guest virtual machines (VMs) 120, and one or more service appliances 170.

Each guest VM 120 is configured to execute a guest operating system (OS) 132, which may be a commodity operating system, such as Microsoft Windows® operating system or Linux® operating system. Each guest VM 120 is further configured to support guest applications (apps) 113 and a thin agent 139. In one embodiment, thin agent 139 is an in-guest driver that executes as part of guest OS 132 and provides an interface, including communications and access for certain system operations, to a service application 174 that executes as part of service appliance 170. In alternate embodiments, thin agent 139 is any in-guest (i.e., executes in guest OS 132) component of any application that executes primarily outside guest OS 132.

Virtualization software 114 is configured to manage and operate host server system 100. Virtualization software 114 provides an execution environment for guest VMs 120 and service appliances 170. Each guest VM 120 and service appliance 170 executes as an application in an independent context, and virtualization software 114 provides a more privileged context that may be used as a bridge between these independent contexts. Virtualization software 114 may be implemented to include a kernel with hardware drivers for managing related hardware subsystems within host server system 100. In one embodiment, virtualization software 114 comprises a host operating system configured to provide system services to guest VMs 120. In other embodiments, virtualization software 114 comprises a hypervisor configured to provide certain system services to guest VMs 120. The hardware subsystems may include, without limitation, computational resources, mass storage, a networking interface, input/output interfaces, a display controller, and power management functions.

As shown, virtualization software 114 includes a multiplexer 159 and a guest integrity module 149 that both operate in the privileged context of virtualization software 114. Among other things, guest integrity module 149 works together with multiplexer 159 to forward data messages between at least one thin agent 139 and at least one service appliance 170. In one embodiment, multiplexer 159 implements a forwarding table that includes at least one entry for each thin agent 139 and each service appliance 170. In such an embodiment, multiplexer 159 implements destination based forwarding, whereby a data message is constructed to include a destination address that corresponds to at least one thin agent 139 or at least one service appliance 170. When multiplexer 159 receives the data message, an associated destination address is matched to an entry within the forwarding table to determine a destination thin agent 139 or service appliance 170 for the data message. The destination thin agent 139 or service appliance 170 may be identified using a TCP/IP (transport control protocol/internet protocol) address, a socket number, a VM identifier, or any other technically feasible identifier.

Each service appliance 170 includes software service application 174 and an access library 172. A given service appliance 170 may execute as an application under control of virtualization software 114, and may be implemented as a virtual machine with a guest OS that is configured to execute service application 174. In some embodiments, service applications 174 that implement security services may execute as applications under the control of virtualization software 114, and are implemented in a single virtual machine, known as a "security virtual machine." Access library 172 is configured so as to communicate with at least one thin agent 139 via the multiplexer 159. In one embodiment, access library 172 opens a different socket connection, for example via TCP/IP, to multiplexer 159 for communication with each different thin agent 139. In alternative embodiments, different message passing techniques may be implemented. For example, a shared memory message passing system may be implemented for communication between thin agents 139 and access libraries 172. In certain embodiments, service appliance $170_M$ is configured to execute on a remote host server system that is coupled to host server system 100 via a data network. In such embodiments, service appliance $170_M$ establishes data connections, such as TCP/IP connections, to one or more guest VMs 120 within host server system 100 and operates substantially identically to other service appliances 170. Similarly, service appliance $170_1$, executing within host server system 100, may connect to and provide services to VMs operating within the remote host server system.

Access library 172 presents an application programming interface (API) (not shown) to service application 174. The API includes service calls for communicating with at least one thin agent 139. Communicating may include, without limitation, establishing a connection with thin agent 139, configuring thin agent 139, receiving event alerts from thin agent 139, and accessing system resources for guest OS 132 associated with thin agent 139. Events that may be reported include file system events, process events, memory events, registry events, and user events. Exemplary file system events include opening a file, closing a file, writing a file, and modifying a file. Exemplary process scheduling events include mapping a file for execution, starting a process, and stopping a process. Certain types of events, such as registry events, may depend on a particular version of guest OS 132. The API may specify that certain events not be reported. For example, service application 174 may request that no events be reported, or that only specific events be reported. In one embodiment, the API enables a connection from service application 174 to a specified thin agent 139 within a guest VM 120 to be established through multiplexer 159.

In this fashion, access library 172 and thin agent 139 operate in concert to provide service application 174 with access to system resources for associated guest OS 132. However, since thin agent 139 executes as part of guest OS 132, thin agent 139 is susceptible to any security breach that compromises the integrity of guest OS 132. For example, in some embodiments, thin agent 139 and service application 174 share a security key to authenticate data packets that are communicated between thin agent 139 and service application 174 via multiplexer 159 and access library 172. In such embodiments, the security of the communications is limited by the confidentiality of the security key. For this reason, embodiments provide a guest integrity module 149 that executes within virtualization software 114 and is programmed to confidentially inject the security key provided by service application 174 into thin agent 139 prior to the transmission of data packets between thin agent 139 and service application 174. Because guest integrity module 149 operates at a more privileged security level than guest OS 132, guest integrity module 149 is able to bridge the context gap between thin agent 139 and service application 174 without exposing service application 174 to a potentially compromised guest OS 132.

More generally, guest integrity module 149 modifies the executable code of guest applications 113, including thin agent 139, while operating in the relatively highly privileged context of virtualization software 114. First, guest integrity module 149 encapsulates secret data as immediate operands within instructions, hereafter referred to as "secret" instructions, in the code of guest applications 113. Guest integrity module 149 then configures a central processing unit (CPU) included in host server system 100 and operable at multiple privilege levels to allow applications that execute at a lower level than virtualization software 114 to execute secret instructions but not to read or write secret instructions.

By encapsulating secret data as immediate operands, the secret data is directly available in the instruction stream. In operation, secret instructions in guest applications 113 may access the secret data by loading the values of the immediate operands into registers included in the CPU. At the privilege level of guest OS 132, since registers are accessible only by actively executing instructions, secret instructions protect secret data from many types of security breaches that compromise guest OS 132 (e.g., through unauthorized access to memory 104 via guest OS 132). However, while secret data is loaded in registers, the secret data is visible to executing instructions. Consequently, interrupts that divert execution control from the currently executing guest application 113 to code that handles interrupt may read the values of registers. "Interrupts," as referred to herein, include exceptions, maskable external interrupts, non-maskable interrupts, instruction breakpoints, data breakpoints, single-steps, and any similar constructs that interrupt the normal execution flow.

In one possible opportunity for attack, an interrupt occurs while guest application 113 is executing secret instructions and the secret data is visible in registers. In such a scenario, the code handling the interrupt is able to access the values of registers and, therefore, the values of the register are exposed at the privilege level of the code handling the interrupt. For this reason, virtualization software 114 also provides guest interrupt security module 159 that executes at the privilege level of virtualization software 114 and ensures that secret data is not visible in the registers to interrupt handling code that executes at a lower level than the virtualization software 114. More specifically, guest interrupt security modules 159 intercepts interrupts targeted to guest OS 132 and overwrites secret data before forwarding the interrupts to guest OS 132 as "virtual" interrupts for processing by interrupt handling code included in guest OS 132. Since overwriting the values of registers may perturb guest applications 113, in some embodiments, guest applications 113 and/or guest interrupt security module 159 include code that reduces the impact of overwriting registers. Together, guest integrity module 149 and guest interrupt security module 159 comprehensively protect secret data from security breaches that compromise guest OS 132.

The various terms, layers and categorizations used to describe the virtualization components in FIG. 1 may be referred to differently without departing from their functionality or the spirit or scope of the invention. For example, host server system 100 may include virtual machine monitors (VMM) (not shown) which implement the virtual system support needed to coordinate operations between virtualization software 114 and their respective VMs. One example of virtualization software 114 that may be used is a hypervisor included as a component of VMware's vSphere® product, which is commercially available from VMware, Inc. of Palo Alto, Calif. It should further be recognized that other virtualized computer systems are contemplated, such as hosted virtual machine systems, where the hypervisor is implemented in conjunction with a host operating system.

Figure 2A:
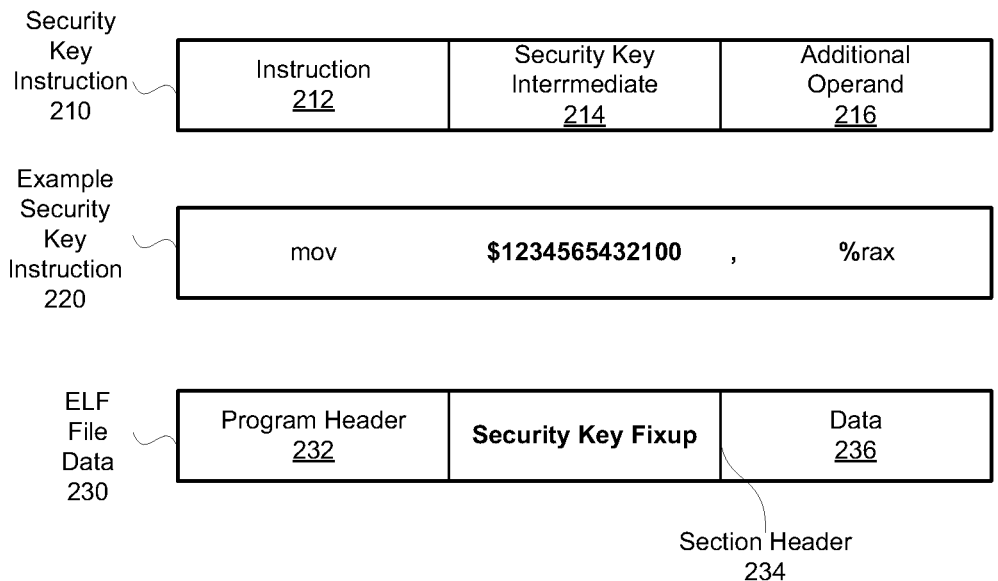
FIGS. 2A and 2B are conceptual diagrams that illustrate how guest integrity module might inject secure data into executable code.
Figure 2B:
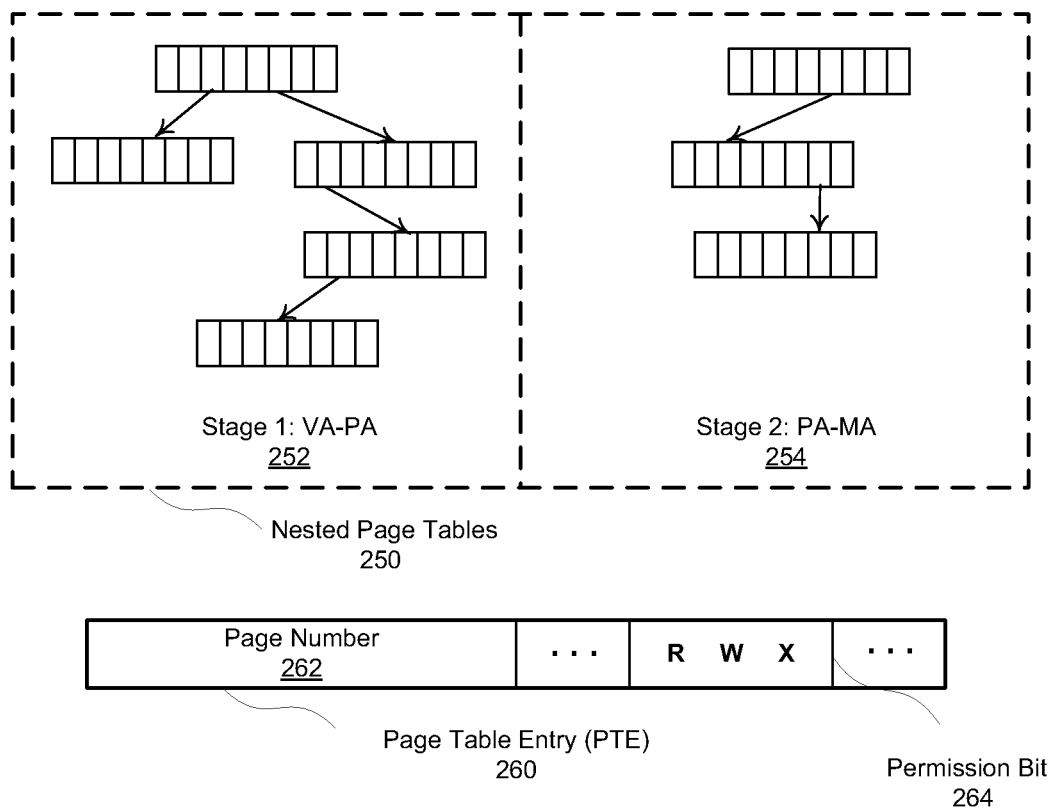

FIGS. 2A and 2B are conceptual diagrams that illustrate how guest integrity module 149 might inject secure data into executable code. In general, guest integrity module 149 exploits the capabilities of host server system 100, such as multiple security levels, to allow guest integrity module 149 to inject secret data into code that executes on guest OS 132 while preventing guest OS 132 from reading the embedded secret data. In one embodiment, guest integrity module 149 uses a security key instruction 210 in the executable code of thin agent 139 to hold secure data, ELF file data 230 to specify the address at which to insert secure data, and nested page tables 250 to disable read and write access to the secure data. Guest integrity module 149 coordinates these activities to maintain confidentially both while guest integrity module 149 injects secret data into thin agent 139 as well as while guest OS 132 executes thin agent 139.

As shown, security key instruction 210 encapsulates a security key intermediate 214, which is a constant operand. When security key instruction 210 is executed by guest OS 132, an instruction 212 is performed on security key intermediate 214 and any additional operands 216. Because security key intermediate 214 is an "immediate" operand, the value of security key intermediate 214 is directly available in the instruction stream, and to security key instruction 210. By contrast, one or more additional operands 216 may specify memory addresses that indirectly reference the corresponding values. It should be recognized that specifying the value of a constant via security key intermediate 214 insulates the constant from security risks associated with memory accessible to guest OS 132.

An example security key instruction 220 illustrates one instruction that is used to protect secret data. As shown, security key intermediate 214 is the value "1234565432100" where the immediate operand type is designated by "$," instruction 212 is "mov," and additional operand 216 is "% rax" (i.e., the rax register). When guest OS 132 executes example security key instruction 220, the processing unit loads secret data "1234565432100" into the rax register from where it can be manipulated further, such as being incorporated into a hashing algorithm.

To effectively inject secret data into executable code requires modifying the executable code in a confidential environment. Since guest integrity module 149 executes at a higher privilege level than guest OS 132, guest integrity module 149 is able to inject the secret data without disclosing the secret data to guest OS 132. In one embodiment, guest integrity module 149 receives the secret data from service application 174 via a secure transmission. Subsequently, guest integrity module 149 accesses Executable and Linkable format (ELF) file data 230 that includes the executable code in addition to one or more relocation entries, known as "fixups," that specify addresses in the executable code that are to be set to the secret data after the executable code is loaded.

As shown, ELF file data 230 includes a program header 232, a section header 234, and data 236. Notably, section header 234 includes "security key fixup" that specifies the address of security key intermediate 214. In operation, as part of preparing executable code that is intended to hold the security key, the software developer of the executable code inserts security key fixups into the corresponding ELF data file 230—conveying that guest integrity module 149 is to overwrite security key intermediates 214 with the security key.

In alternate embodiments, ELF may be replaced with any other format that supports relocations, such as Windows® Preinstallation Environment. Further, it should be recognized that other techniques for obtaining and injecting secret data into executable code may be employed by guest integrity module 149.

To continuously hide the secret data from read access by guest OS 132, guest integrity module 149 uses the addressing and protection mechanisms provided by host server system 100. Host sever system 100 carries out mappings from a guest virtual address space of guest VMs 120$_1$-120$_N$ or any other applications running virtualization software 114 to a machine address space of memory (referred to herein as the "host physical address space") using nested page tables 250. As shown in FIG. 2B, nested page tables 250 is a page translation hierarchy that includes a stage 1: guest virtual address (VA) to guest physical address (PA) 252 and a stage 2: PA to machine address (MA) 254.

Both stage 1: VA-PA 252 and stage 2: PA-MA 254 include page table entries (PTEs) 260, and each PTE 260 includes, inter alia, a page number 262 and permission bits 264. Page number 262 indicates the next page in the page table translation hierarchy. If PTE 240 is at the lowest level of the page table translation hierarchy, then page number 262 corresponds to a data page. In general, attributes, such as permission bits 264, associated with a data page are defined by the more restrictive of the stage 1: VA-PA 252 and the stage 2: PA-MA 254 attributes traversed in the page table translation hierarchy. As shown, permission bits 264 include a read "R" bit, a write "W" bit, and execute "X" bit. For PTE 260, if the read and write bits are each clear and the execute bit is set, then the instruction referenced by PTE 260 is execute-only. If any PTE 260 along the page table translation hierarchy traversed to translate an address in guest virtual address space to host physical address space is designated as execute-only, then guest OS 132 is unable to read from the address or write to the address, but is able to execute an instruction at the address.

In host server system 100, guest OS 132 is capable of modifying PTEs 260 included in stage 1: VA-PA 252 either via software or hardware mechanisms, but guest OS 132 is unable to modify PTEs 260 included in stage 2: PA-MA 254. By contrast, guest integrity module 149 is capable of modifying PTEs 260 included in stage 2: PA-MA 254. Guest integrity module 149 leverages this difference in PTE 260 accessibility in conjunction with permissions bits 264 to protect security key instruction 210 from attempts to ascertain the value of security key intermediate 214 by guest OS 132.

More specifically, before performing the security key fixup specified in ELF file data 230, guest integrity module 149 suspends guest OS 132 and enables write access to PTE 260 corresponding to security key instruction 210. After performing the security key fixup, guest integrity module 149 disables read and write access to PTE 260 corresponding to security key instruction 210, enables execute-only access to PTE 260, and unsuspends guest OS 132. Since guest OS 132 is unable to read security key intermediate 214 included in security key instruction 210, the value of security key intermediate 214 is protected from security breaches that compromise guest OS 132, guest apps 113, and thin agent 139.

It should be understood that FIG. 2B illustrate one possible configuration of a page table translation hierarchy—nested page tables 250—and bits in PTE 260, and the number and arrangement of elements in the page table translation hierarchy and PTE 260 can be varied from what is shown. Host server system 100 may employ any number of translation lookaside buffers (TLBs) as part of the page translation process. Further, in alternate embodiments, host server system 100 may carry out mappings from the guest virtual address space to the host physical address space using shadow page tables to map guest virtual address spaces within guest VMs $120_1$-$120_N$ directly to the physical address space of memory. Embodiments include any mechanism that enables guest integrity module 149 and not guest OS 132 to designate the address corresponding to security key intermediate 214 or a range of addresses that includes the address corresponding to security key intermediate 214 as execute-only. For example, in some architectures, the code pages accessed via extended page tables may be "tagged" as execute-only.

Figure 3:
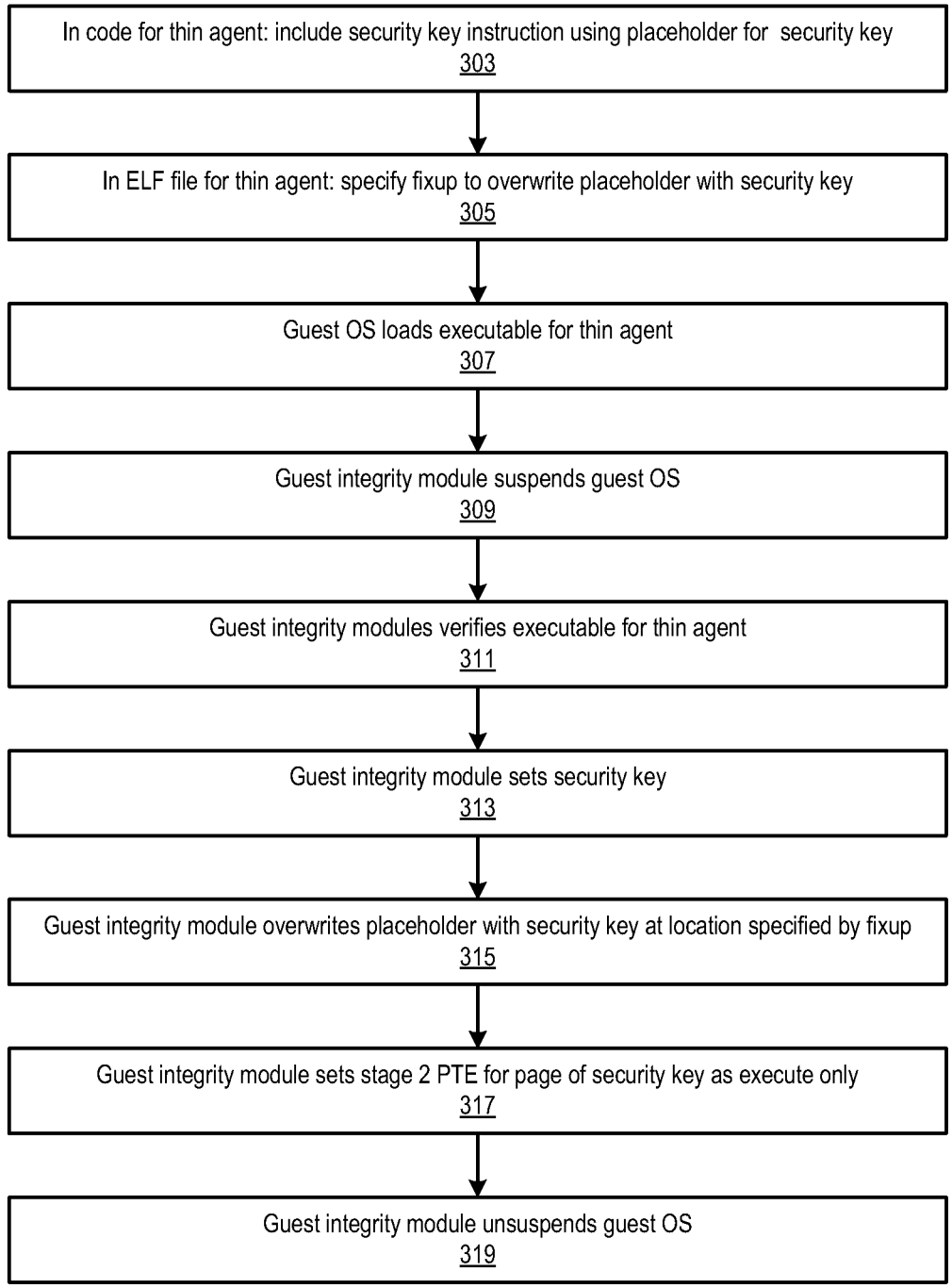
FIG. 3 depicts a flow diagram of method steps for injecting secret data into executable code of an application.

FIG. 3 depicts a flow diagram of method steps for injecting secret data into executable code of an application. In the embodiment illustrated herein, thin agent 139 is an in-guest driver that executes as part of guest OS 132 and provides an interface, including communications and access for certain system operations, to service application 174. Service application 174 has established a security key which is unknown to guest OS 132. Although guest OS 132 may be compromised, service appliance 170 and virtualization software 114 execute in different contexts and the integrity of these contexts is unaffected by compromised guest OS 132.

This method begins at step 303 where a software developer includes security key instruction 210 in the code of thin agent 139. As part of security key instruction 210, the software developer includes a placeholder (e.g., a meaningless value to be replaced later) as security key intermediate 214. At step 305, the software developer inserts a security key fixup into ELF data file 230 corresponding to thin agent 139. The security key fixup specifies the address of the placeholder and conveys that this address is to be overwritten with the security key.

At step 307, guest OS 132 loads ELF file data 230 corresponding to thin agent 139. More specifically, guest OS 132 loads the executable for thin agent 139 and may perform any number of fixups that are not associated with the security key. At step 309, guest integrity module 149 suspends guest OS 132. While guest OS 132 is suspended, guest OS 132 is unable to perform operations and, consequently, guest integrity module 149 may alter page table entries 260 and the executable of thin agent 139 without detection by guest OS 132. However, if guest OS 132 is already compromised, then the executable of thin agent 139 may also be compromised. To thwart any attempt at breaching security via thin agent 139, guest integrity module 149 verifies the executable for thin agent 139 before exposing thin agent 139 to any secure data. Guest integrity module 149 may verify the executable for thin agent 139 in any technically feasible fashion. For instance, guest integrity module 149 may independently load a second copy of the executable of thin agent 139 via ELF file data 230 and then compare the two copies of the executable of thin agent 139.

At step 313, guest integrity module 149 establishes the security key to match the security key that is expected by service application 174. For example, if service application 174 incorporates the security key as part of a hashing algorithm, then security key instruction 210 may be configured to cause thin agent 139 to use the same security key as part of a complementary hashing algorithm. Guest integrity module 149 may establish this security key in any fashion that preserves the confidentiality of the security key. For instance, guest integrity module 149 may receive the security key in a confidential transmission from service application 174 and then ensure that the security key is not stored in memory accessible to guest OS 132 at any time guest OS 132 is active (i.e., unsuspended). After establishing the security key, guest integrity module 149 processes the security key fixup in ELF file data 230, overwriting the placeholder that is located at the address of security key intermediate 214 with the security key.

To ensure the continued confidentiality of the security key, while guest OS 132 is still suspended, guest integrity module 149 modifies permission bits 264 in stage 2: PA-MA 254 page table entry 260 corresponding to the page that includes the address of security key intermediate 214. More specifically, guest integrity module 149 disables read and write access, and enable execute-only access for a range of addresses that includes security key instruction 210 (step 317). At step 319, guest integrity module 149 unsuspends guest OS 132, and thin agent 139 executes in guest OS 132. In operation, thin agent 139 and service application 174 cooperatively use the security key embedded in thin agent 139 and known to service application 174 for validation purposes, without exposing the security key to security risks of guest OS 132.

Figure 4:
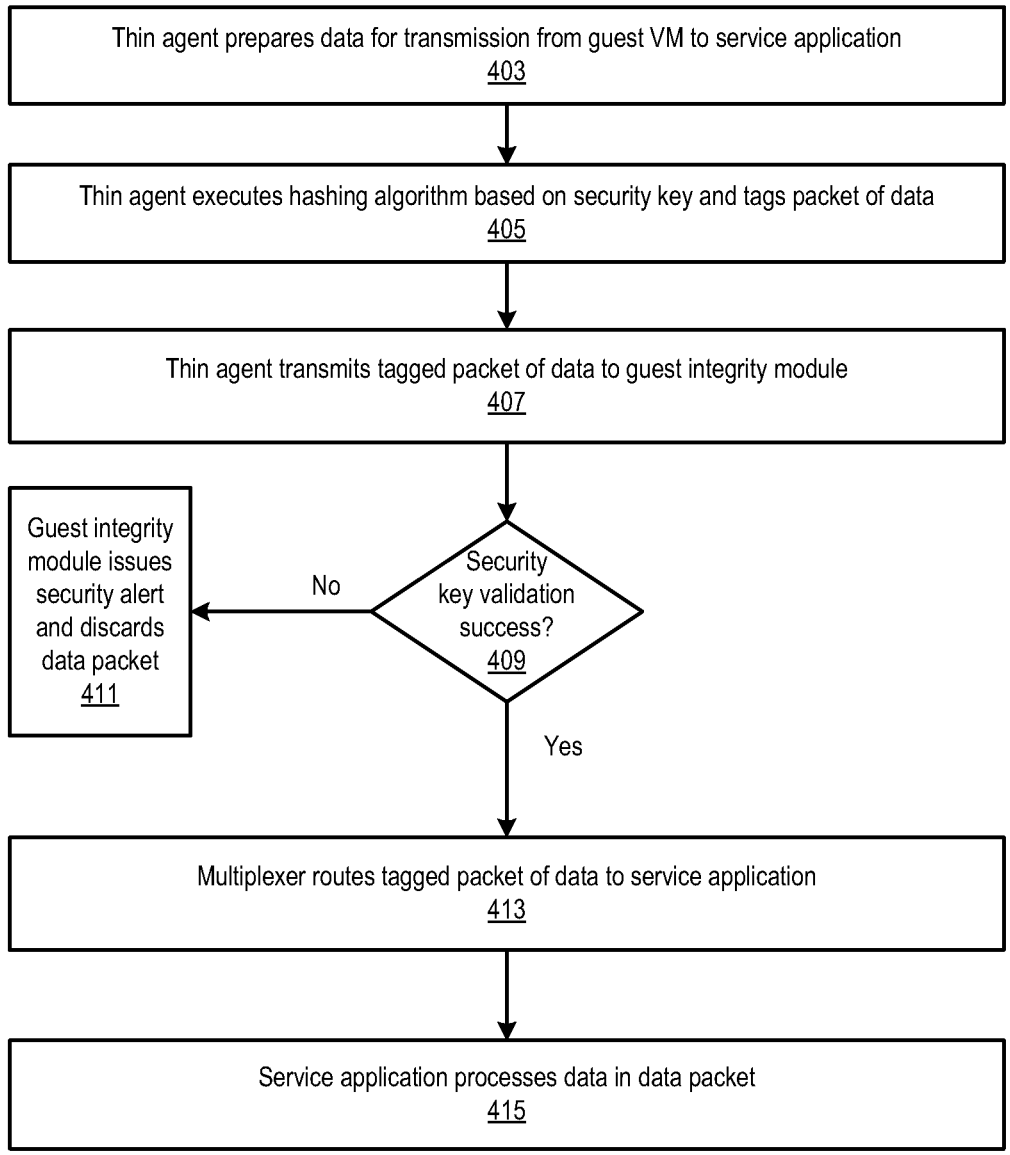
FIG. 4 depicts a flow diagram of method steps for authenticating a data packet using secret data embedded in executable code.

FIG. 4 depicts a flow diagram of method steps for authenticating a data packet using secret data embedded in executable code. In the embodiment illustrated herein, thin agent 139 executes as part of guest OS 132 in guest VM 120 context and service application 174 executes as part of service appliance 170 in a separate, service appliance 170 context, such as a security VM. Guest integrity module 149 executes as part of virtualization software 114 in a context that executes at a more privileged permission level than guest VM 120 context, enabling guest integrity module 149 to act as a secure bridge between guest VM 120 and service appliance 170 contexts. The code of thin agent 139 includes security key instruction 210 in which security key intermediate 214 is set to a security key known to thin agent 139, guest integrity module 149, and service application 174, but not to guest OS 132. Further, security key intermediate 214 is designated as execute-only and, consequently, thin agent 139 may execute security key instruction 210 without exposing the value of the security key to guest OS 132.

This method begins at step 403 where thin agent 139 prepares data for transmission from guest VM 120 to service appliance 170. As part of preparing the data, thin agent 139 executes a hashing algorithm that includes security key instruction 210 (step 405). Since security key instruction 210 includes the value of the security key as security key intermediate 214, thin agent 139 is able to execute the hashing algorithm without loading the security key in memory accessible by guest OS 132, and thus preserves the confidentiality of the security key. Thin agent 139 then tags the packet of data based on the hashing algorithm, and transmits the tagged packet of data to guest integrity module 149 (step 407) in any technically feasible fashion. In some embodiments, thin agent 139 accesses an I/O port specific to guest VMs 120, known as a backdoor port, to communicate with virtualization software 114, including guest integrity module 149.

Upon receiving the tagged packet of data, guest integrity module 149 performs verification operations to ensure that the security key is valid. If, at step 409, guest integrity module 149 determines that the security key is not valid, then guest integrity module 149 issues a security alert and discards the data packet 411. In this fashion, if guest OS 132 is compromised and attempts to transmit malicious data to service application 174, then the security key enables guest integrity module 149 to intercept the data, isolating service application 174 from compromised guest OS 132.

At step 409, if guest integrity module 149 determines that the security key is valid, then guest integrity module 149 forwards the tagged data packet to multiplexer 159. At step 413, multiplexer 159 routes the tagged data packet to service application 174. At step 415, service application 174 receives the tagged data packet and processes the data in the data packet. As part of receiving the tagged data packet, service application 174 may execute a hashing algorithm that is complementary to the hashing algorithm implemented by thin agent 139—using the shared, but confidential, security key to recreate the original data.

As this method illustrates, embedding a secure passkey in code enables confidential data transmission. In general, embedding secure data in code enables a wide variety of powerful security measures. For instance, developers may use guest integrity module 149 to create a code protection domain—establishing confidential data that is set by instructions only upon authorized entry to the code protection domain and subsequently checked by instructions executing in the code protection domain before executing confidential code.

FIGS. 5A and 5B are conceptual diagrams that illustrate how guest integrity module 149 creates a code protection domain. In one embodiment, the code protection domain may be established in any context, such as guest VM 120, that operates at a lower privilege level than guest integrity module 140. To establish the code protection domain, guest integrity module 149 confidentially replaces placeholders for both an immediate operand in a move security key instruction 515 (shown in an authorization code 510 that is executed by guest OS 132) and an immediate operand in a compare security key instruction 595 (shown in a verification code 590) with a specified security key. Following compare security key instruction 595, verification code 590 includes another instruction that branches execution based on the results of compare security key instruction 595. More specifically, if the comparison indicates that the value in an authorization register 555 in a central processing unit (CPU) 550 matches the security key, then code in the code protection domain continues to run as requested. However, if the comparison indicates that the value in authorization register 555 does not match the security key, then the code in the code protection domain aborts and does not perform as requested.

As shown in FIG. 5B, developers include authorization code 510 (including move security key instruction 515) at well-defined entry points 582 to code executed within the code protection domain 580. As also shown, developers include verification code 590 (including compare security key instruction 595) at verification points 584 in confidential code executed within the code protection domain 580. Developers may establish any number of code protection domains with any number of entry points 582 and any number of verification points 584. Developers may include any number of normal instructions 598 in code executed within the code protection domain. Further, developer may select any technically feasible register of CPU 550 as authorization register 555 and any confidential value as the security key.

Similarly to the techniques disclosed herein to enable confidential data transmission, guest integrity module 149 uses ELF files for the authorization code 510 and the verification code 590 to specify the addresses at which to insert the security key. Guest integrity module 149 also uses nested page tables 250 to disable read and write access to the security key. Guest integrity module 149 coordinates these activities to maintain confidentially both while guest integrity module 149 injects the security key into both the authorization code and the verification code as well as while guest OS 132 executes.

Figure 6A:
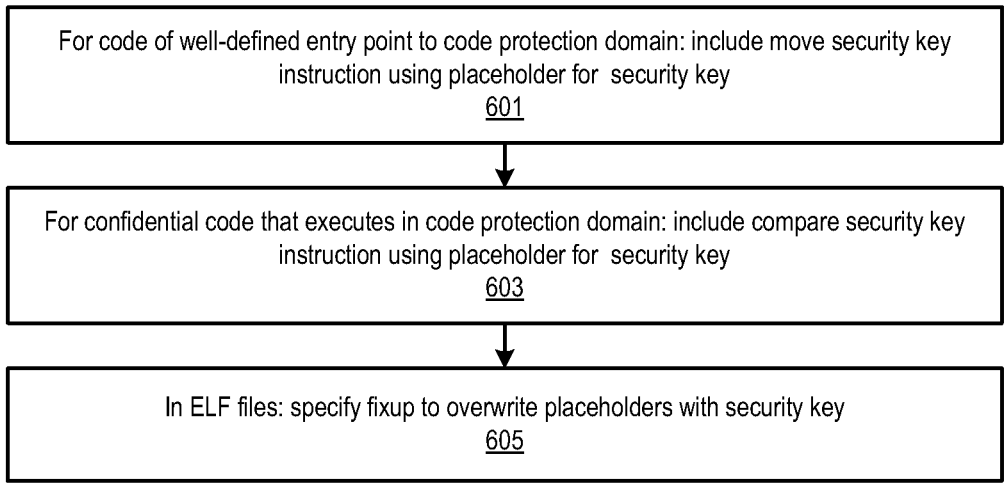
FIG. 6A depicts a flow diagram of method steps for creating executable code that is configured via secret data to execute within a code protection domain.

FIG. 6A depicts a flow diagram of method steps for creating executable code that is configured via secret data to execute within a code protection domain. In the embodiment illustrated herein, the code protection domain, including guest OS 132, executes within guest VM 120. Prior to the execution of this method, authorization register 555 is reserved for verification purposes, and guest integrity module 149 establishes a security key that is unknown to guest OS 132. Although guest OS 132 may be compromised, guest integrity module 149 executes in the context of virtualization software 114, and the integrity of this context is unaffected by guest OS 132. In alternate embodiments, the code protection domain may be established in a different context, such as a one associated with service appliance 170 or a different guest OS 132, and the steps of this method are modified accordingly. Although this method is described in the context of a single entry point 582 and a single verification point 584, the code protection domain may have any number of entry points 582 and any number of verification points 584 that are configured in a similar fashion.

This method begins at step 601 where a software developer includes move security key instruction 515 (with a placeholder as an immediate operand) in authorization code 510 at a well-defined entry point 582 to the code protection domain. Correspondingly, at step 603 a software developer includes compare security key instruction 595 (with a placeholder as an immediate operand) and appropriate branching instructions at a strategically selected point in confidential code.

At step 605, the software developer inserts security key fixups into ELF data files corresponding to the executable code that include placeholders. Each security key fixup specifies the address of a placeholder and conveys that this address is to be overwritten with the security key.

The software developer has now prepared the executable code for configuration using a security key that is not disclosed to guest VM 120.

Figure 6B:
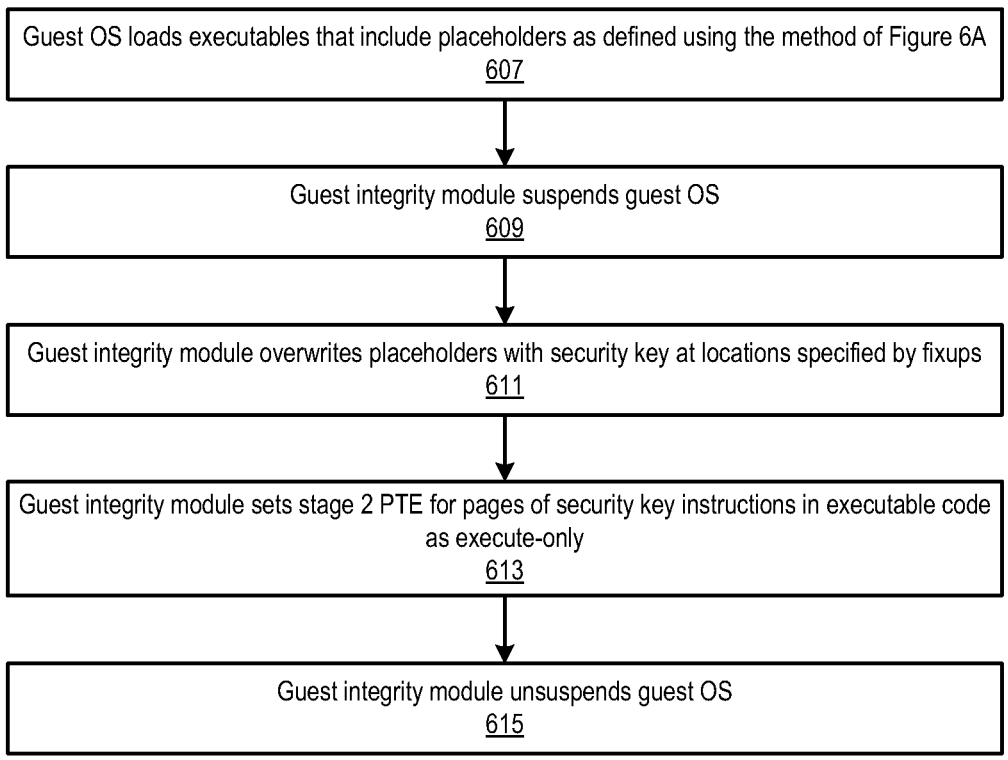
FIG. 6B depicts a flow diagram of method steps for configuring a code protection domain using secret data embedded in executable code.

FIG. 6B depicts a flow diagram of method steps for configuring a code protection domain using secret data embedded in executable code. This method begins at step 607 where guest OS 132 loads ELF file data 230 for executable code in the code protection domain. The ELF file data 230 includes placeholders and security key fixups defined using the method steps of FIG. 6A. At step 609, guest integrity module 149 suspends guest OS 132. At step 611, guest integrity module 149 processes the security key fixup in each ELF data file, overwriting the placeholders that are located at the address of the immediate operands included in move security key instructions 515 and compare security instruction 595 with the security key. To ensure the continued confidentiality of the security key, while guest OS 132 is still suspended, guest integrity module 149 disables read and write access, and enables execute-only access for addresses that include move security key instructions 515 and compare security key instruction 595 (step 613). At step 615, guest integrity module 149 unsuspends guest OS 132. The code protection domain then uses the security key in conjunction with authorization register 555 to detect unauthorized execution of code in the code protection domain, without exposing the security key to security risks of guest OS 132.

Figure 7:
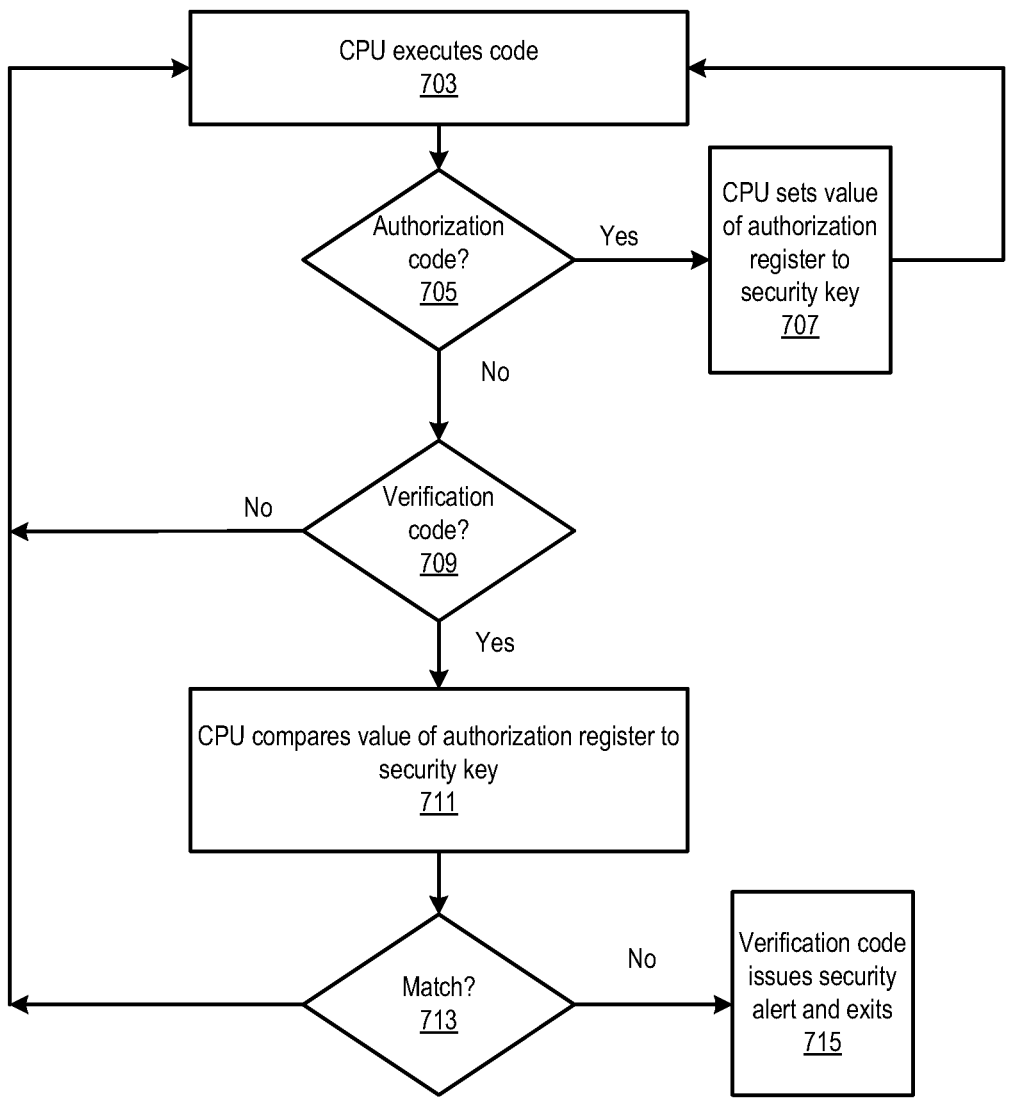
FIG. 7 depicts a flow diagram of method steps for verifying code authorization using secret data embedded in executable code.

FIG. 7 depicts a flow diagram of method steps for verifying code authorization using secret data embedded in executable code. In the embodiment illustrated herein, a code protection domain, including guest OS 132, executes within guest VM 120. Guest integrity module 149 executes as part of virtualization software 114 in a context that executes at a more privileged permission level than guest VM 120 context. Authorization code 510 (at a well-defined entry point 582 to the code protection domain) includes move security key instruction 515 in which an immediate operand is set to a security key known to guest integrity module 149, but not to guest OS 132. Similarly, verification code 590 (at a verification point 584 in confidential code that executes in the code protection domain) includes compare security key instruction 595 in which an immediate operand is set to the security key. Further, move security key instruction 515 and compare security key instruction 595 are designated as execute-only and, consequently, guest OS 132 may execute these instructions without exposing the value of the security key to guest OS 132. Although this method is described in the context of a single entry point 582 and a single verification point 584, the code protection domain may have any number of entry points 582 and any number of verification points 584 that are configured in a similar fashion.

This method begins at step 703 where CPU 550 is executing code. If the code that CPU 550 is executing is authorization code 510 (step 705), then this method proceeds to step 707 and CPU 550 executes move security key instruction 515 included in authorization code 510. Notably, the code protection domain is configured such that authorization code 510 is included only at well-defined entry points 582 to the code protection domain. As part of step 707, CPU 550 sets the value of authorization register 555 to the security key without loading the security key into memory accessible by guest OS 132, and thus preserves the confidentiality of the security key. This method then returns to step 703, where CPU 550 continues executing code.

If, at step 705, the code that CPU 550 is executing is not authorization code 510, then then this method proceeds directly to step 709. At step 709, if the code that CPU 550 is executing is verification code 590 (inserted to detect unauthorized access to the confidential code), then this method proceeds to step 711. At step 711, CPU 550 executes compare security key instruction 595 included in verification code 590—comparing the value of authorization register 555 to the security key. CPU 550 performs this operation without loading the security key into memory accessible by guest OS 132. If, at step 713, the value of authorization register 555 equals the security key, then verification code 590 allows execution of the confidential code, and this method returns to step 703, where CPU 550 continues executing code.

At step 713, if the value of authorization register 555 does not equal the security key, then verification code issues a security alert and exits (step 715). Such a scenario occurs when this method does not enter the code protection domain at an authorized entry point 582 and, consequently, any access of executable code within the code protection domain is unauthorized. For example, a malicious application may branch into confidential code in an attempt to bypass any checks at the authorized entry points 582. Typically, developers will include verification code 590 in strategic locations within confidential code, limiting the impact of unauthorized access to the code protection domain.

As illustrated in FIGS. 1-7, guest integrity module 149 provides a variety of security mechanisms that enable code to confidentially access secret data directly via registers, not indirectly via memory accessible to guest OS 120. Such measures reduce the ability of compromised applications, including operating systems, to obtain the secret data. Guest interrupt security module 159 enables additional security measures that protect the secure data from interrupts that may divert control to a compromised interrupt handler while the secret data is loaded in registers.

Figure 8A:
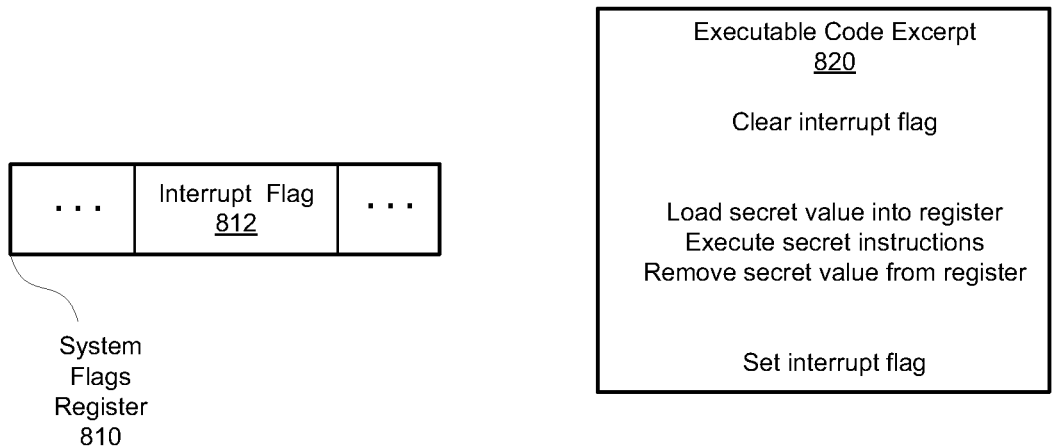
FIGS. 8A and 8B are conceptual diagrams that illustrate how guest applications and guest interrupt security module preserve the security of secret data embedded in instructions.
Figure 8B:
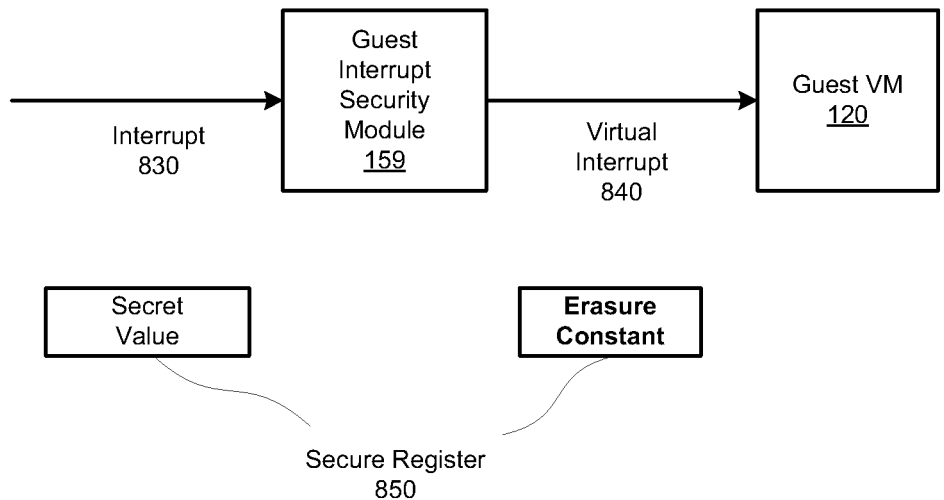

FIGS. 8A and 8B are conceptual diagrams that illustrate how guest applications 113 and guest interrupt security module 159 preserve the security of secret data embedded in instructions. Together, guest applications 113 and guest interrupt security module 159 implement a variety of techniques that ensure that interrupt handling code does not execute within guest VM 120 while secret data is loaded in registers. For each interrupt, guest applications 113 and/or guest interrupt security module 159 either disable the interrupt while secret data is loaded in registers or remove secret data from registers while guest VM 120 executes code that handles the interrupt.

FIG. 8A illustrates how guest applications 113 leverage features provided by CPU 550 to disable one or more interrupts. A system flags register 810 is a register in CPU 550 that stores various information regarding the state of CPU 550. As CPU 550 executes instructions, the instructions may read and write system flags register 810 as allowed by the privilege level. As shown, systems flag register 810 includes an interrupt flag 812. If interrupt flag 812 is set, then maskable interrupts are enabled, whereas if interrupt flag 812 is clear, then maskable interrupts are disabled.

An executable code excerpt 820 is a portion of the code of a particular guest application 113 that is configured to access a secret value via a register. As shown, to protect the secret value from compromised maskable instruction handling code, guest application 113 disables interrupts by clearing interrupt flag 812 prior to loading the secret value in the register. Further, to minimize the time that maskable interrupts are disabled, guest application 113 re-enables interrupts by setting interrupt flag 812 after guest application 113 no longer requires the secret value. Any number of guest applications 113 may include any number of similarly constructed executable code excerpts 820 that access any number of secret values.

Alternatively, or in conjunction with this guest application 113 code bracketing technique, guest interrupt security module 159 may be configured to suppress any number of interrupts, Upon receiving an interrupt, guest interrupt security module 159 may cause CPU 550 to continue execution at the instruction affected by the interrupt without performing any further interrupt handling operations. Such a technique may be used to ensure confidentiality of secret values while responding to all types of interrupts.

FIG. 8B depicts how guest interrupt security module 159 intercepts interrupts 830 targeted to guest OS 132—removing secret data from secure registers 850 before forwarding corresponding virtual interrupts 840 to guest VM 120. As shown, after intercepting interrupt 830, guest interrupt security module 159 overwrites secret data in secure register 850 with an erasure constant. Subsequently, guest interrupt security module 159 generates virtual interrupt 840 corresponding to interrupt 830 and routes virtual interrupt 840 to guest VM 120. Host server system 100 may be configured to route interrupts 840 to guest interrupt security module 159 in any technically feasible fashion as known in the art. Further, guest interrupt security module 159 may generate any type of virtual interrupt 840 based on interrupt 840 consistent with the desired handling of interrupt 830. In some embodiments, guest interrupt security module 159 is configured to forward interrupt 830 without generating virtual interrupt 840.

In some embodiments, erasure constant may be any value (e.g., zero or a random number). In other embodiments, erasure constant is a pre-determined value that secret instructions executing in guest applications 113 may leverage to determine whether the data in secure register 850 is valid secret data. For example, after executing secret instructions that operate on secret data, guest application 113 may compare the value in secure register 850 to the pre-determined erasure constant. If the value in secure register 850 equals the pre-determined erasure constant, then guest application 113 recognizes that an interrupt was received during execution of the secret instructions and the secret data was overridden. Since the secret instructions may have operated on erroneous data in secure register 850, guest application 113 may then elect to re-execute the secret instructions.

Alternatively, guest interrupt security module 159 may be configured to store secret values in memory locations that are not accessible to guest VM 120 prior to overwriting the secret values. After guest VM 120 handle virtual interrupt 840, guest interrupt security module 159 loads secure registers 850 from the memory locations, thereby enabling guest applications 113 to continue operating using the secret values.

Any number of registers may be configured as secure registers 850. In some embodiments, guest interrupt security module 159 indiscriminately overwrites all registers in CPU 550. In other embodiments, one or more selected registers in CPU 550 are defined as secure registers 850 using any standard differentiating mechanism, such as bitmaps that define which registers are "secure." In such embodiments, developers ensues that guest applications 113 load secret data into secure registers 850 but not into other registers. Correspondingly, guest interrupt security module 159 overwrites the values in secure registers 850 but not the values in other registers.

In general, embodiments of host server system 100 may implement any of the techniques disclosed herein in any combination to guard secret data from exposure to potentially comprised guest OS 132. Further, the disclosed techniques may be modified to address additional security risks inherent in the architecture of different host server systems and CPUs. For instance, some CPUs 103 allow branching to arbitrary offsets within code. Malicious software executing in guest VMs 120 may exploit this characteristic by branching into the middle of secret instructions and attempting to deduce embedded secret values in a trial-by-error approach. To thwart such an effort, guest integrity module 149 may be configured to decompose secret values into individual bits, injecting each bit into a different secret instruction.

Figure 9:
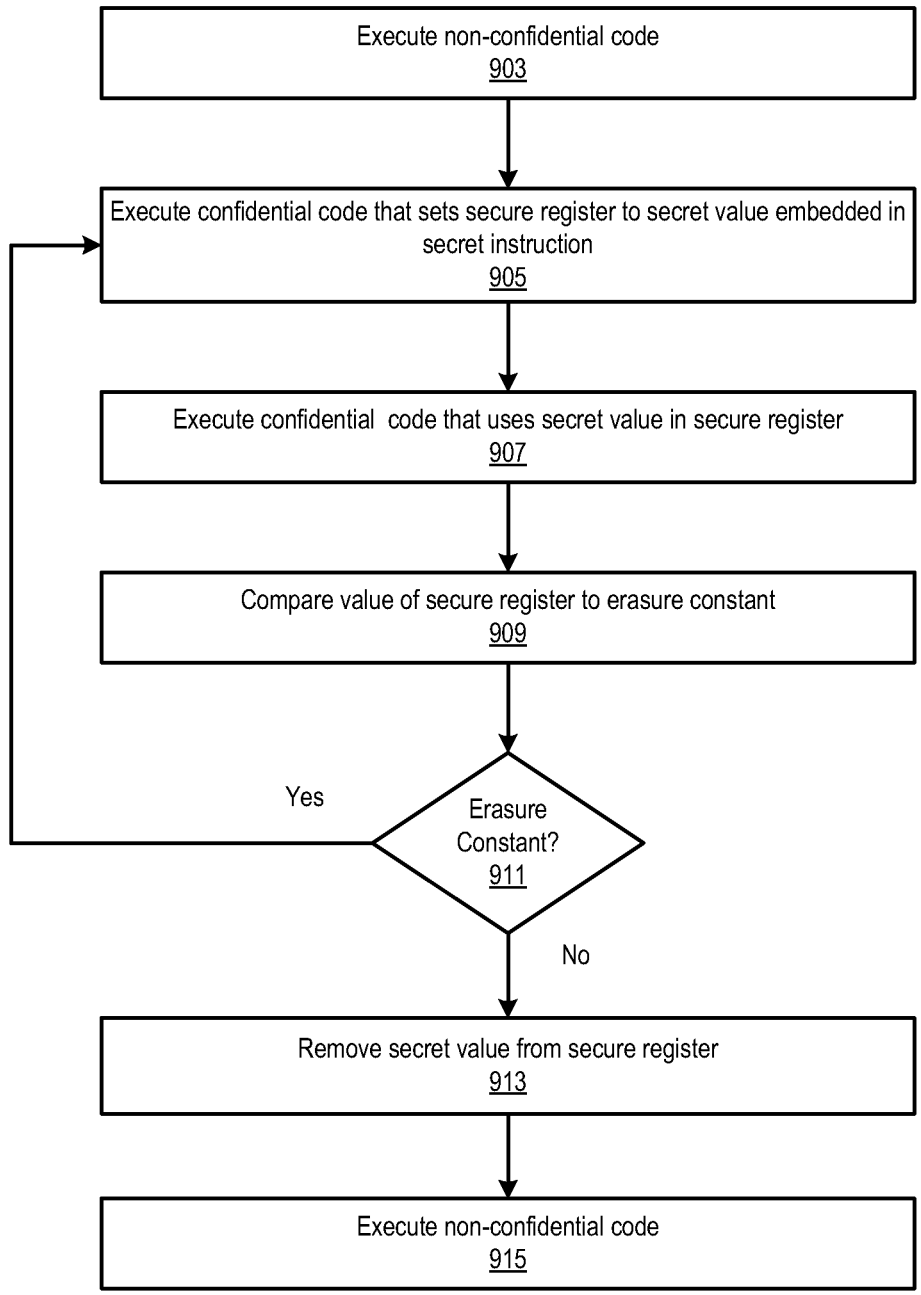
FIG. 9 depicts a flow diagram of method steps for executing code that operates on secret data embedded in instructions.

FIG. 9 depicts a flow diagram of method steps for executing code that operates on secret data embedded in instructions. In the embodiment illustrated herein, guest OS 132 runs guest application 113 in guest VM 120 context. Guest integrity module 149 and guest interrupt security module 159 both execute as part of virtualization software 114 in a context that executes at a more privileged permission level than guest VM 120 context. The code of guest application 113 includes confidential code in which one or more execute-only instructions load secret values (i.e., data that is secret from guest VM 120 context) directly into secure registers 850. To protect the secret values from potentially compromised guest VM 120, guest integrity module 149 injects the secret values into execute-only instructions, and guest integrity security module 159 intercepts any interrupts 830—writing pre-determined erasure constants to secure registers 850. The code of guest application 113 also includes non-confidential code that does not use the secret values.

This method begins at step 903, where guest OS 132 executes guest application 113. Guest application 113 initially executes non-confidential code and then executes confidential code that sets secure register 850 to a secret value embedded as an immediate operand in an execute-only instruction (step 905). At step 907, guest application 113 executes additional confidential code that accesses the secret value in secure register 850 without exposing the secret data to guest OS 132. At step 909, guest application 113 executes an instruction in the confidential code that compare the value of secure register 850 to a pre-determined erasure constant that is not equal to any valid secret value.

At step 911, if guest application 113 determines that the value of secure register 850 matches the erasure constant, then guest application 113 recognizes that secure register 850 no longer contains the secret value. Such a scenario may occur when execution control is diverted from guest application 113 in response to interrupt 830 while guest application 113 is executing the confidential code. Consequently, any confidential code that accessed secure register 850 may have operated on corrupted data and produced erroneous results. To obtain accurate results, guest application 113 is configured to re-execute the confidential code. More specifically, this method returns to step 905 where guest application 113 re-executes the instruction that loads secure register 850 with the secret value. Guest application 113 continues to execute steps 905-911, re-running the confidential code until successfully executing the confidential code without losing execution control to interrupt handling code.

In various embodiments, the confidential code may be broken into subsections, each subsection including an instruction that loads the secret value into secure register 850 and a later instruction that compares the value of secure register 850 to the erasure constant. By breaking the confidential code into subsections, guest application 113 may effectively implement algorithms that are expected to execute longer than a predicted interval between interrupts 830.

If, at step 911, guest application 113 determines that the value of secure register 850 does not match the erasure constant, then guest application 113 deduces that secure register 850 still contains the secret value. At step 913, guest application 113 removes the secret value from secure register 850 by overwriting the value of secure register 850. Now that the secret value is no longer visible in secure register 850, guest application 113 executes non-confidential code (step 915) without exposing the secret value to the non-confidential code or guest OS 132.

Figure 10:
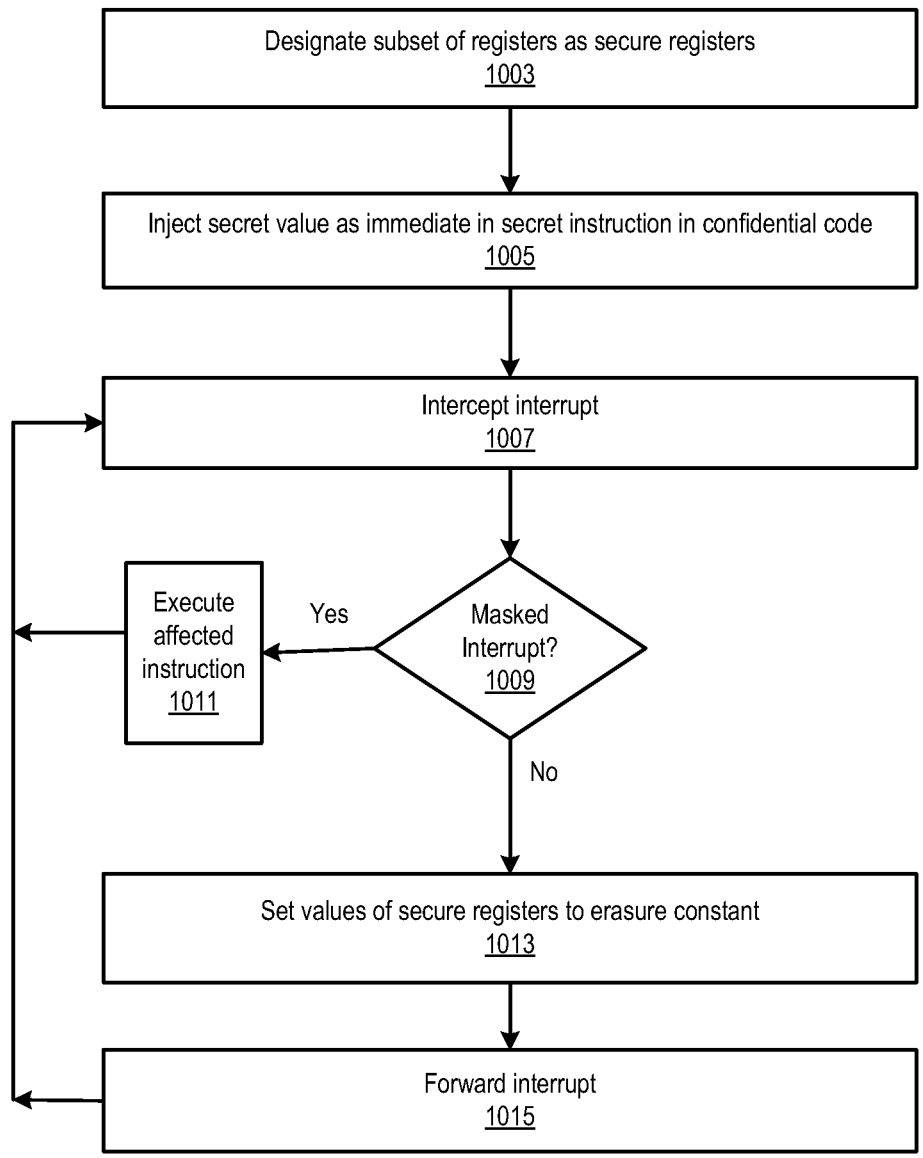
FIG. 10 depicts a flow diagram of method steps for handling interrupts without exposing secret data embedded in instructions to unauthorized access.

FIG. 10 depicts a flow diagram of method steps for handling interrupts without exposing secret data embedded in instructions to unauthorized access. In particular, this method conceals a secret value from guest OS 132 and any interrupt handling code implemented by guest OS 132 and executed with the context of guest VM 120. In the embodiment illustrated herein, guest OS 132 runs guest application 113 in guest VM 120 context. Guest integrity module 149 and guest interrupt security module 159 both execute as part of virtualization software 114 in a context that executes at a more privileged permission level than guest VM 120 context. The code of guest application 113 includes confidential code in which one or more execute-only instructions load secret values (i.e., data that is secret from guest VM 120 context) directly into secure registers 850.

This method begins at step 1003, where a developer designates a set of registers in CPU 803 as secure registers 850. The developer may differentiate between secure registers 850 and non-secure registers in any technically feasible fashion, such as creating a bitmap that indicates which registers are secure. At step 1005, guest integrity module 149 injects secret values as immediate operands into secret instructions, disables read access to the secret instructions, disables write access to the secret instruction, and enables execute access to the secret instructions.

At step 1007, guest interrupt security module 159 intercepts interrupt 830 targeted for guest VM 120. As used herein, interrupt 830 may be any type of exception or interrupt that diverts execution control to interrupt handling code. In general, guest security module 159 handles interrupt 830 as expected while concealing the secret values from interrupt handling code included in guest OS 132. Notably, if interrupt 830 is masked via interrupt flag 812 in system flags registers 810, then guest interrupt security module 159 orchestrates the expected behavior—resuming normal execution without invoking interrupt handling code in guest OS 132. In such a scenario, because interrupt handling code in guest OS 132 is bypassed, the secret values are not exposed to guest OS 132 and guest interrupt security module 159 does not conceal the secret values.

At step 1009, guest integrity security module 159 determines whether interrupt 830 is masked. If, at step 1007, guest interrupt security module 159 determines that interrupt 830 is masked, then this method proceeds to step 1011. At step 1011, guest interrupt security module 159 causes CPU 550 to execute the instruction affected by interrupt 830 without executing any additional interrupt handling code. Such a technique suppresses interrupt 830, enabling control to return to software application 113 without exposing secure registers 850 to guest OS 132 and any included interrupt handling code. This method then returns to step 1007, where guest interrupt security module 159 intercepts another interrupt 830.

If, at step 1009, guest interrupt security module 159 determines that interrupt 830 is not masked, then this method proceeds directly to step 1013. At step 1013, guest integrity security module 159 sets the values of secure registers 850 to a pre-determined erasure constant. By overwriting the secret values in secure registers 850 with the erasure constant, guest integrity security module 159 conceals the secret values. Further, the erasure constant enables guest applications 113 to determine that secret values previously loaded into secure registers 850 are no longer contained in secure registers 850. At step 1015, guest interrupt security module 159 forwards interrupt 830 to guest VM 120 to be processed by interrupt handling code included in guest OS 132. This method then returns to step 1007, where guest interrupt security module 159 intercepts another interrupt 830. This method continues to execute steps 1007-1015, intercepting interrupts 830 and protecting secret values by either bypassing interrupt handling code in guest OS 132 or overwriting the secret values with erasure constants.

The embodiments disclosed herein detail specific use cases in which embedding secure data in code executed by a compromised operating system effectively thwarts attempts by the compromised operating system to obtain the secure data. However, the described embodiments are to be considered as illustrative and not restrictive. Other use cases that leverage the same underlying techniques to securely inject secret data in code are envisioned. Further, although host server system 100 supports a virtualization environment, any host server system that supports at least two levels of privilege and provides a mechanism to designate certain addresses as execute-only may implement these security techniques.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of securing secret values stored in registers in a computer system operable in a plurality of privilege levels, wherein the method executes at a first privilege level and comprises:
    intercepting a first interrupt or exception that is targeted to an operating system executing instructions at a second privilege level, the instructions including a move instruction that sets a register to a secret value by moving an immediate value in the move instruction into the register, a compare instruction that determines whether or not the register contains the secret value by comparing a pre-determined erasure constant with contents of the register containing the secret value, and instructions that rely on the register containing the secret value for correct processing of the instructions, wherein the second privilege level is lower than the first privilege level and the first interrupt or exception is triggered during execution of the instructions that are executing at the second privilege level;
    in response to the intercepting, overwriting the secret value stored in the register with the pre-determined erasure constant; and
    then forwarding the first interrupt or exception to the operating system for handling of the first interrupt or exception by the operating system, wherein the operating system interprets the pre-determined erasure constant stored in the register as a trigger to re-execute the instructions.

2. The method of claim 1,
    wherein the registers in the computer system include a subset of the registers that further includes the register and other registers, the other registers containing secret values, and
    further comprising overwriting the secret values stored in the other registers with the pre-determined erasure constant while retaining values stored in the registers that are not included in the subset.

3. The method of claim 1, wherein the first interrupt or exception is triggered while the operating system is executing an application at a third privilege level that is not greater than the second privilege level.

4. The method of claim 1, further comprising:
    intercepting a second interrupt;
    determining that the second interrupt is disabled;
    identifying an instruction that is affected by the second interrupt; and
    causing the instruction that is affected by the second interrupt to execute at the first privilege level without forwarding the second interrupt for handling at the second privilege level.

5. A computer system operable in a plurality of privilege levels, comprising
    a processor that is programmed with an operating system that executes at a second privilege level, and
    a security module that operates at a first privilege level that is higher than the second privilege level and executes a method of securing secret values stored in registers in the computer system that includes the steps of:
    intercepting a first interrupt or exception that is targeted to an operating system executing instructions at the second privilege level, the instructions including a move instruction that sets a register to a secret value by moving an immediate value in the move instruction into the register, a compare instruction that determines whether or not the register contains the secret value by comparing an immediate value in the compare instruction with contents of the register containing the secret value, and instructions that rely on the register containing the secret value for correct processing of the instructions, wherein the first interrupt or exception is triggered during execution of the instructions that are executing at the second privilege level;
    in response to the intercepting, overwriting the secret value stored in the register with a pre-determined erasure constant; and then
    forwarding the first interrupt or exception to the operating system for handling of the first interrupt or exception by the operating system, wherein the operating system interprets the pre-determined erasure constant stored in the register as a trigger to re-execute the instructions.

6. The computer system of claim 5, wherein the registers in the computer system include a subset of registers that further includes the register and other registers, the other registers containing secret values, and the method further comprises overwriting the secret values stored in the other registers with the pre-determined erasure constant while retaining values stored in the registers that are not included in the subset.

7. The computer system of claim 5, wherein the first interrupt or exception is triggered while the operating system is executing an application at a third privilege level that is not greater than the second privilege level.

8. The computer system of claim 5, wherein the method further includes the steps of:
intercepting a second interrupt;
determining that the second interrupt is disabled;
identifying an instruction that is affected by the second interrupt; and
causing the instruction that is affected by the second interrupt to execute at the first privilege level without forwarding the second interrupt for handling at the second privilege level.

9. A non-transitory computer-readable storage medium comprising instructions, which when executed at a first privilege level in a computer system operable in a plurality of privilege levels, causes the computer system to carry out the steps of:
intercepting a first interrupt or exception that is targeted to an operating system executing instructions at a second privilege level, the instructions including a move instruction that sets a register to a secret value by moving an immediate value in the move instruction into the register, a compare instruction that determines whether or not the register contains the secret value by comparing an immediate value in the compare instruction with contents of the register containing the secret value, and instructions that rely on the register containing the secret value for correct processing of the instructions, wherein the second privilege level is lower than the first privilege level and the interrupt or exception is triggered during execution of the instructions that are executing at the second privilege level;
in response to the intercepting, overwriting the secret value stored in the register with a pre-determined erasure constant; and then
forwarding the first interrupt or exception to the operating system for handling of the first interrupt or exception by the operating system, wherein the operating system interprets the pre-determined erasure constant stored in the register as a trigger to re-execute the instructions.

10. The non-transitory computer-readable storage medium of claim 9,
wherein the computer system includes a set of registers, and the set of registers in the computer system includes a subset of registers that further includes the register and other registers, the other registers containing secret values and
wherein the steps further comprise overwriting the secret values stored in the other registers with the pre-determined erasure constant while retaining values stored in the registers that are not included in the subset.

11. The non-transitory computer-readable storage medium of claim 9, wherein the first interrupt or exception is triggered while the operating system is executing an application at a third privilege level that is not greater than the second privilege level.

12. The non-transitory computer-readable storage medium of claim 9, wherein the steps further comprise:
intercepting a second interrupt;
determining that the second interrupt is disabled;
identifying an instruction that is affected by the second interrupt; and
causing the instruction that is affected by the second interrupt to execute at the first privilege level without forwarding the second interrupt for handling at the second privilege level.

* * * * *